United States Patent [19]

Nozawa

[11] Patent Number: 4,607,803
[45] Date of Patent: Aug. 26, 1986

[54] ROTOR/STATOR WINDING AND METHOD AND APPARATUS FOR PRODUCING SAME

[75] Inventor: Yoshikuni Nozawa, Nagano, Japan

[73] Assignee: Entac Company, Limited, Japan

[21] Appl. No.: 592,779

[22] Filed: Mar. 26, 1984

Related U.S. Application Data

[62] Division of Ser. No. 511,687, Jul. 7, 1983, Pat. No. 4,538,083.

[30] Foreign Application Priority Data

| Jul. 7, 1982 | [JP] | Japan | 57-118015 |
| Aug. 26, 1982 | [JP] | Japan | 57-147989 |
| Aug. 26, 1982 | [JP] | Japan | 57-146990 |
| Nov. 25, 1982 | [JP] | Japan | 57-206412 |
| Nov. 25, 1982 | [JP] | Japan | 57-206413 |
| Nov. 25, 1982 | [JP] | Japan | 57-206414 |
| Nov. 29, 1982 | [JP] | Japan | 57-208995 |

[51] Int. Cl.$^4$ ............................ B65H 81/06
[52] U.S. Cl. .................. 242/1.1 R; 140/92.1; 242/7.05 B; 242/7.03; 29/598
[58] Field of Search ............... 140/92.1, 92.2; 29/597, 29/598; 242/1.1 R, 2, 3, 7.05 B, 7.03, 7.14; 310/198-208, 194; 254/134.6

[56] References Cited

U.S. PATENT DOCUMENTS

| 1,964,221 | 6/1934 | Schweiter | 140/92.2 |
| 3,191,081 | 6/1965 | Faulhaber | 310/207 |
| 3,360,668 | 12/1967 | Faulhaber | 310/195 |
| 3,441,761 | 4/1969 | Painton | 310/266 |
| 3,793,548 | 2/1974 | Faulhaber | 310/266 |
| 4,200,971 | 5/1980 | Shimizu et al. | 310/198 |
| 4,323,806 | 4/1982 | Aoki | 310/266 |

FOREIGN PATENT DOCUMENTS

1519297 7/1978 United Kingdom .................. 242/2

Primary Examiner—Francis S. Husar
Assistant Examiner—Robert Showalter
Attorney, Agent, or Firm—Sughrue, Mion, Zinn, Macpeak, and Seas

[57] ABSTRACT

An electromechanical transducer has a coreless rotor or stator winding formed of a series of flat band loops, in case of a long or short cup-shaped cylindrical winding, each of the loops having an active portion inclined to both the axial and tangential direction of the rotor or stator winding and an inactive bowstring portion oriented perpendicular to the axial direction thereof. In case of a nearly flat disc or dish shaped rotor or stator winding, each of the loops has a main active portion at a top or bottom portion of the winding, the active portion being perpendicular to the axial direction of the winding. An output torque to be generated therefrom an effective magnetic flux area and density is improved.

17 Claims, 42 Drawing Figures

FIG. 38
PRIOR ART

ROTOR/STATOR WINDING AND METHOD AND APPARATUS FOR PRODUCING SAME

This application is a divisional of U.S. application Ser. No. 511,687 filed in the U.S. Patent and Trademark Office on July 7, 1983 now U.S. Pat. No. 4,538,083.

BACKGROUND OF THE INVENTION

1. Field of the Invention

The present invention relates to an electromechanical transducer having a drug cup-shaped rotor or stator winding, and a method and apparatus for producing same.

2. Description of the Prior Art

Various kinds of cylindrical rotor/stator windings have been known.

For example, in the U.S. Pat. No. 3,191,081 to Faulhaber, issued on June 22, 1965, there is disclosed a method for manufacturing a cylindrical winding with a zigzag winding arrangement. In the U.S. Pat. No. 3,360,668 to Faulhaber, issued on Dec. 26, 1967, there is disclosed a method for manufacturing a cylindrical winding in accordance with a zigzag step winding by using pins so that a wire is swung in the axial direction of a winding core, thereby winding a wire stepwise. In the U.S. Pat. No. 3,441,761 to Painton et al, issued on Apr. 29, 1969, there is disclosed a method for manufacturing a cylindrical winding in which a wire is wound around a winding core in a hexagonal manner and is then crushed, thereby manufacturing a cylindrical winding. In addition, there has been known a method for manufacturing a cylindrical winding in which a single coil of hollow rectangular whirlpool like configuration is butt arranged to the surface of a cylinder so as to produce a cylindrical winding. In any of the above mentioned methods, attempts have been made to form a cylindrical winding which, in projection, has a rhombic shape or the like.

As is well known, an output shaft torque T may be provided by the following formula.

That is, $$T = BgSZI/2\pi a,$$

where

Bg is the magnetic flux density,
S is the effective area,
I is the electric current,
Z is the total number of conductors, and
a is the number of circuits arranged in parallel.

The torque T becomes maximum in case the projection contour of turns of the cylindrical winding is rectangular.

When the projection contour of the winding is rhombic, the torque T becomes one-half that of a cylindrical winding having a rectangular projection contour.

By the way, various kinds of motors such as a coreless motor, slotless motor, brushless motor and the like have recently been required to be made compact, particularly in thickness, while keeping a good performance and a rapid response without inertia. It has been desired to make the cylindrical winding have a long cylinder of a small diameter to ensure a good efficiency thereof for use in these various kinds of motors. It is also desired to provide a compact, over-square or flat rotor/stator winding with a high output power. In such a winding, a top or bottom portion is used as a magnetically effective or active region.

Figures 34, 35, 36, 37:
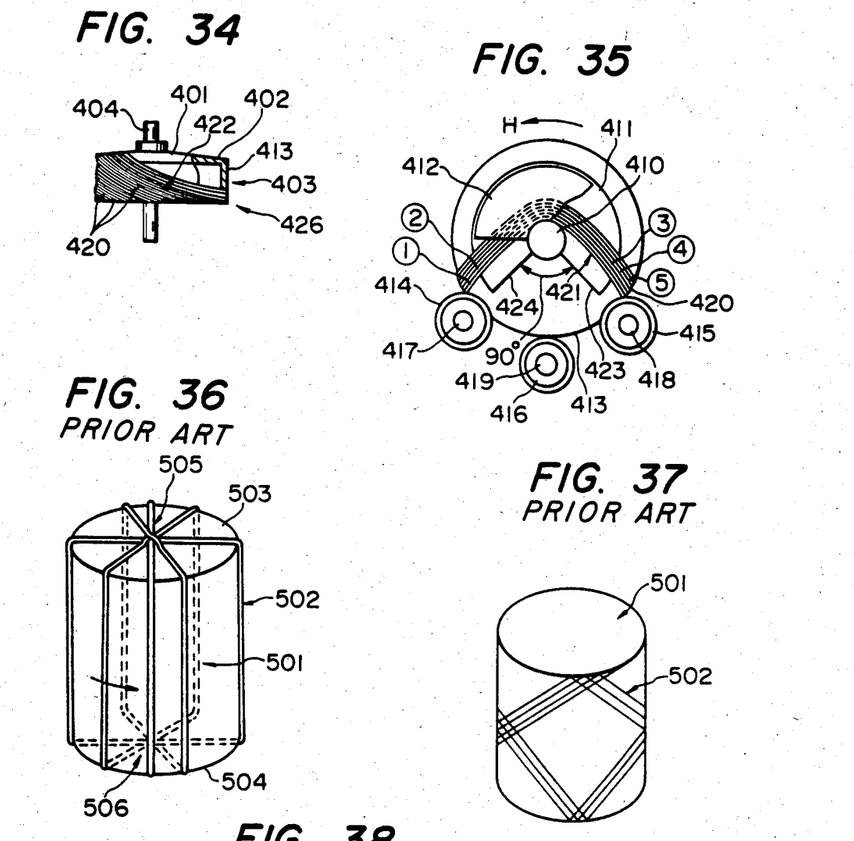
FIG. 35 is a view showing a modification of the apparatus shown in FIG. 29.
FIGS. 36 to 38 are illustrations of winding of the conventional techniques.

FIG. 36 is an illustration of a cylindrical winding of a rectangular cross section. Since a wire 502 extends along the peripheral surface of a cylindrical core 501 in parallel with its axis, the wire 502 is bent at a right angle at the end surfaces 503, 504 so as to pass through the center thereof and this operation is repeated around the periphery of the cylindrical core 501 so as to produce the cylindrical winding of the rectangular cross section, the wire is concentrated so as to overlap each on another at top and bottom center portion 505, 506 of the cylindrical core 501, thereby causing a drawback in that it is difficult that this cylindrical winding is put into practical use.

As the cylindrical winding of a rectangular cross section in projection, the wire is provided along the edges at the ends to form an opening thereat. In this case, however, the wire is concentrated so as to overlap each on another at the edges at the ends. Hence, it is difficult that the cylindrical winding is put into practical use.

FIG. 37 is a view of a winding according to the disclosure of the above described U.S. Pat. No. 3,191,081 and U.S. Pat. No. 3,360,668, showing that the wire 502 is wound around the peripheral surface of the cylindrical core 501 in such a manner as to present a rhombic configuration, thereby producing the cylindrical winding. In this case the wire 502 is wound in such a way as to present the rhombic configuration to produce the cylindrical winding, it becomes possible to prevent the wire 502 from being concentrated so as to overlap each on another. However, the torque to be generated becomes one half in comparison with the cylindrical coil winding of a rectangular projection. This is therefore unsatisfactory because of its poor performance.

Figure 38:
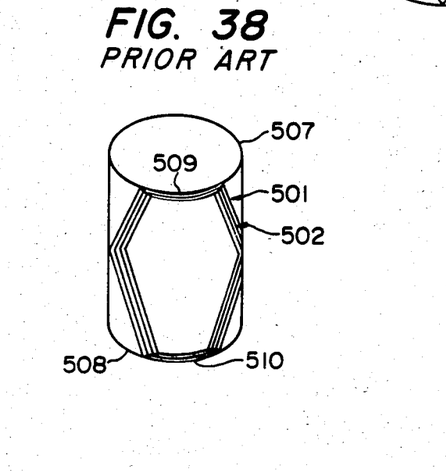

FIG. 38 is a view of a winding according to the disclosure of U.S. Pat. No. 3,793,548 which shows an improvement of the cylindrical winding as shown in FIG. 37. Since the wire 502 is provided so as to be along with the edges 507, 508 at the ends, the wire 502 is concentrated to overlap each on another at the portions as indicated by reference numerals 509, 510. Therefore, it is difficult that this constitution is put into practical use.

More specifically, the above-described U.S. Pat. No. 3,793,548 shows a tangentially directed hexagonal pattern winding forming a hollow right-circular cylindrical rotor winding as shown in FIG. 38. As described above, U.S. Pat. No. 3,191,081 and U.S. Pat. No. 3,441,761 disclose a rhombic pattern and a hexagonal pattern, respectively. In the rhombic pattern, the effective area S is represented as follows:

$$S \simeq DL/2 < DL$$

where D is the diameter and L is the height of the rotor winding. The relationship represents a reduction of efficiency in the rhombic pattern in comparison with the rectangular pattern shown in FIG. 36. In case of an axially elongated hexagonal rotor winding, the effective arear S is represented as follows:

$$S \simeq DL_1 - DL_2/2 < DL$$

where $L_1$ is the length of a rectangular section of the hexagonal pattern and $L_2/2$ is the height of a triangular sections, L (longer length between the two opposite apexes) being represented by the sum of $L_1 + L_2$.

According to the disclosure of U.S. Pat. No. 3,793,548, tangentially directed inactive head portions causes an excessive wire overlapping or pile-up which results in difficulty in realizing such a winding. At the same time, as a matter of fact, such a pattern forms a three-dimensional hexagonal pillar or column and it is impossible to form a flat cylindrical winding.

SUMMARY OF THE INVENTION

In view of the above, a primary object of the invention is to provide a method and an apparatus for producing a rotor/stator winding to meet the above-noted demands.

A principal object of the invention is to provide an improved winding arrangement reduced through a new winding method using a soft roller technique.

Another object of the invention is to provide a winding arrangement whereby a higher torque may be obtained.

A still another object of the invention is to provide a winding arrangement enabling to be applied to a disc or dish shaped rotor/stator winding.

According to the invention, there is provided a cup-shaped winding for motors, having a plurality of bands of wire, said bands being lapped and displaced one on another and being wound around a rotary center axis of said winding step by step at a predetermined angle, said winding having at one end a shoulder portion, at the other end an opening portion and therebetween an intermediate cylindrical portion, said shoulder portion being composed of the lapped and displaced bands of wire for forming a bowstring portion, said intermediate cylindrical portion being composed of the lapped and displaced bands of wire for forming an inclined portion, and said opening portion being composed of the lapped and displaced bands of wire for forming a peripheral portion.

According to the invention, there is provided a method for producing a winding for motors, comprising the steps of: pushing at least one roller against at least one shoulder portion at an end of a winding core; winding a wire around said winding core while layer said wire on said at least one shoulder portion; utilizing said at least one shoulder portion as a member for preventing said wire from sliding and dropping from said at least one shoulder portion; and rotating said winding core in a predetermined manner for obtaining a winding.

According to another aspect of the invention, the winding is in the form of a cylindrical shape and has a wire band in which the wire is wound in a concentrated manner, said wire band being formed with a predetermined pitch around the periphery of said winding core, one portion of said wire is laid on said shoulder so as to form a bowstring portion of said winding while said wire is laid along the end face of said winding core so as to form a peripheral portion of said winding which is distant from said shoulder portion in the axial direction thereof, said bowstring portion is constituted in such a way that its bowstring length gradually becomes large as the winding of said wire is grown while said peripheral portion gradually becomes large as the winding of said wire is grown, said wire band is provided with an inclined portion which is inclined with respect to the axial line of said winding core along the peripheral surface of said winding core between said peripheral portion and said bowstring portion and each wire which constitutes said inclined portion crosses each another in said inclined portion or each wire which constitutes said inclined portion aligned in said inclined portion.

According to the invention, a pair of rollers are provided in contact with a circumferential edge of said winding core in the vicinity of said shoulder portion at a predetermined angle around its periphery, another roller is brought into contact with a peripheral surface, far from said pair of rollers, of said winding core in the vicinity of the other shoulder portion in the axial direction of said winding core, between said pair of rollers, the wire is guided along with the peripheral surface of said winding core in such a manner as to be in contact with said another roller whereby the wire is aligned to be wound on the peripheral surface of said winding core, thereby producing a divided coil which is composed of wire bands, and whereby the wire is arranged in a repeated manner over the circumference of said winding core for producing a cup-shaped winding.

According to the invention, at least three rollers are brought into contact with the peripheral surface of said winding core, two rollers among those rollers are used so that the wire is aligned to be laid on said shoulder portion, an aligning plate and a guide plate are arranged in the axial direction of said winding core at the side of said shoulder portion, said wire is aligned to be laid on said aligning plate, the roller other than said two rollers is used so that said wire is aligned to be laid on the opening end face, said wire is wound between said shoulder portion and said opening end face so as to form the wire bands while said wire passes through said guide plate, and said aligning plate is rotated with respect to said winding core so that the wire bands laid on the aligning plate are dismounted from the aligning plate to be laid on the surface of the shoulder portion, thereby producing a cup-shaped winding.

According to the invention, there is provided on apparatus for producing a winding for motors, comprising: means for feeding a wire around a predetermined axis; a winding core around which the wire is wound, said winding core having at least one shoulder portion at its one end; at least one roller; means for pushing said roller against said winding core; and means for rotating said winding core around a predetermined fixed rotary axis in a predetermined manner. The wire wound around said winding core is prevented from sliding and dropping from said shoulder portion by the assistance of said roller.

DESCRIPTION OF THE PREFERRED EMBODIMENTS

A method for manufacturing a cylindrical winding in accordance with the present invention will now be described together with an apparatus with which the invention is concerned.

Figures 1, 1A:
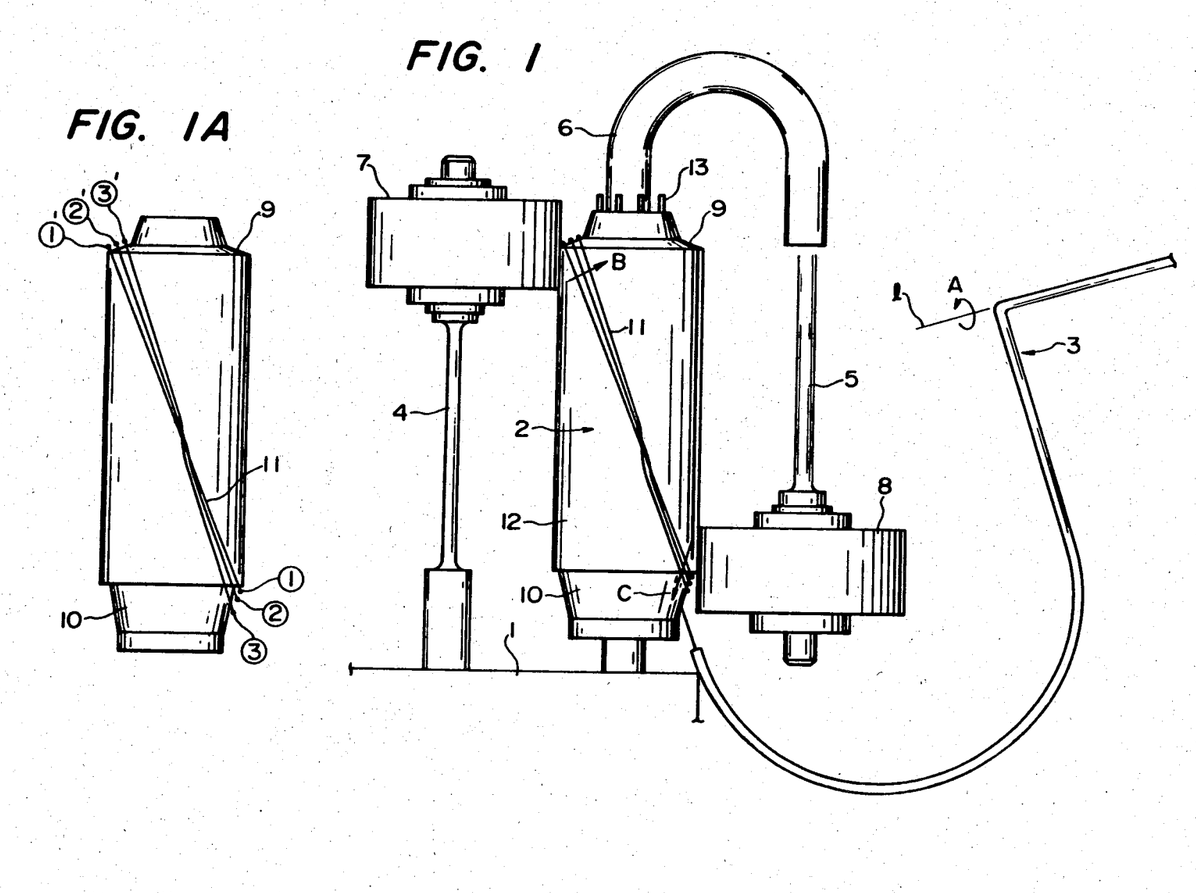
FIG. 1 is a schematic side elevational view of an apparatus for producing a winding according to the invention.
FIG. 1A is a view illustrating the winding order attained in the apparatus shown in FIG. 1.

FIG. 1 is a view showing essential parts of means for manufacturing a cylindrical winding in accordance with the present invention. Reference numeral 1 denotes a base; 2, a cylindrical winding core or spindle; 3, a winding head and 4,5 denote posts. The post 4 is fixed to the base 1. The other post 5 passing through a U-shaped guide cylinder 6 is detachably fixed to the base 1. The guide cylinder 6 is also detachably mounted to the base 1. The cylindrical winding core or spindle 2 is supported by the guide cylinder 6 to be rotated by a motor (not shown). Rollers 7, 8 made of elastic materials such as rubber, plastics and the like are rotatably supported on the posts 4, 5, respectively.

These elastic rollers 7, 8 function as members for preventing the wound wire from sliding and dropping off. They are pushed against the cylindrical winding core 2 with suitable deformation. The posts 4, 5 are subjected to spring resiliency so that the elastic rollers 7, 8 are pushed against the core 2. There are formed shoulder portions 9, 10 at both ends of the winding core 2. A coated conductive wire 11 which preferably has a diameter less than 0.25 mm, is guided through the winding head 3 and is wound around these shoulder portions. The slant angle of the shoulder portion 10 is made greater than that of the shoulder portion 9. The elastic rollers 7, 8 are pushed against the peripheral surface 12 of the core 2 in confronting relation with the shoulder portions 9, 10, respectively. The winding head 3 is adapted to rotate in the direction indicated by the arrow A around the rotational axis line l, so that the wire is wound obliquely with respect to the rotary axis of the cylindrical winding core 2. It is preferable that the extension of the axis line l be adapted to intersect with the rotary axis at the center of the core 2 in order that the wire may be wound smoothly.

Figure 1B:
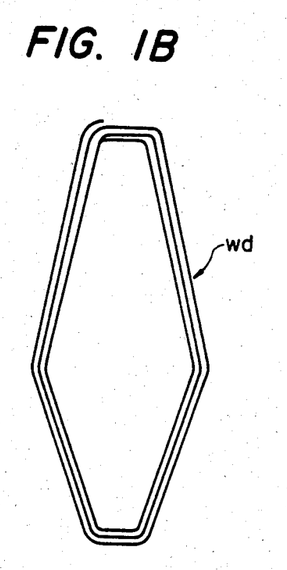
FIG. 1B is a view showing turns of wire, in projection, wound by the apparatus shown in FIG. 1.

In FIG. 1, the cylindrical winding core 2 has a small diameter in comparison with its axial length, and the winding head 3 is not displaced in the axial direction l. In this case, the wire 11 which is wound along the roller 8 slides down in turn towards the shoulder portion 10 while being given a tensile force. Referring to FIG. 1A illustrating the winding turn order, this tendency will be explained more in detail. Reference numeral ①, ②, ③ denote the order in accordance with which the wire 11 is arranged on the shoulder portion 10, while reference numerals ①', ②', ③' denote the order in accordance with which the wire 11 is arranged on the shoulder portion 9. Since the elastic rollers 7, 8 are deformed in elastic contact with the winding core 2, the projection contour of the turn of wire is substantially in the form of a hexagonal shape as shown in FIG. 1B. The hexagonal shape is preferable for the winding because it approaches the rectangular shape which is most preferable for the maximum output shaft torque. In other words, the turns of the wire wound around the shoulder portions 9, 10 of the cylindrical winding core 2 slidingly move in the directions indicated by the arrows B, C, respectively, along the portions of the elastic rollers 7, 8 which are pushed against the cylindrical winding core 2. Thus, the configuration of the winding which conforms to these portions of the elastic rollers 7, 8 which are pushed against the cylindrical winding core 2 may be obtained.

The above-described winding operation is repeated while rotating the winding core 2 to thereby obtain a full winding. Then, the cylindrical winding core 2 and the post 5 are removed from the base 1 together with the guide cylinder 6. The guide cylinder 6 is detached from the core 2. The portion, located on the shoulder portion 10, of the winding is opened outside. The winding is separated apart from the cylindrical core 2 in its axial direction.

In accordance with the method for manufacturing a cup-shaped winding of the invention, it is also possible to effect a continuous winding or a step winding. If the winding head is rotated while the core is being rotated at a constant speed, it becomes possible to effect the continuous winding. If the cylindrical core is rotated at a predetermined angle and thereafter, the rotation of the cylindrical core is brought to a halt, and the winding head 3 is rotated predetermined times so that the wire 11 is wound around the core 2 and the rotation of the winding head 3 is brought to a halt, and this operation is repeated alternately, it is possible to effect the step winding.

It is possible to use a fusible-adhesive wire to adhere together turns of wire with alcohol or heat. There are provided pins 13 in the vicinity of the shoulder portion 9. The pins 13 are used for tapping. The winding head 3 is moved back and forth along the axis line 1 by drive means such as a solenoid, so that the wire is hooked on the pins 13.

Figure 1C:
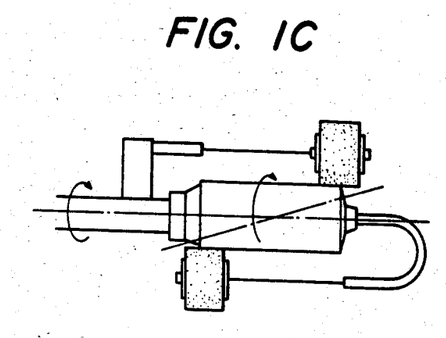
FIG. 1C is a view illustrating a zigzag winding method according to the invention.

In the above-described embodiment, a roller technique is used for attaining a rotary winding. However, it is possible to carry out a zigzag winding method by applying elastic rollers as shown in FIG. 1C. In the zigzag winding, the rollers are fixed to the shaft of the rotary core and the wire is fed reciprocatingly in right and left directions and the wire is obliquely laid around the winding core as indicated by phantom line. It is obvious that the winding core is rotatingly displaced step by step corresponding to a turn of wire in accordance with a diameter of the wire.

Figure 2:
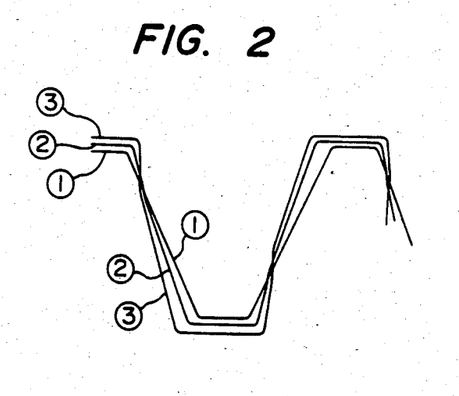
FIG. 2 is a developed view showing a wire band according to the invention.
Figure 3:
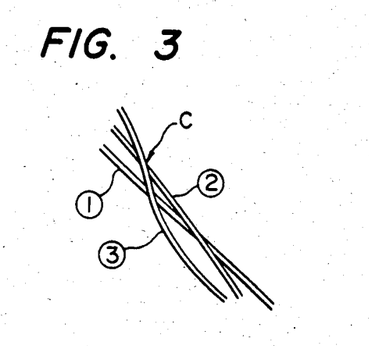
FIG. 3 is an enlarged view of the wire band shown in FIG. 2.

FIG. 2 is a developed view illustrating a twisted cross-over band of wire in accordance with the method described above with reference to FIGS. 1, 1A and 1B. As shown in FIG. 2, each of the cross-over portions C is formed in the vicinity of the shoulder portion on the trailing side. The cross-over portions are formed if the cup-shaped winding is long in the axial direction relative to its diameter. Such a winding manner will be hereinafter referred to as the twisted cross-over winding method. FIG. 3 is an enlarged view showing the cross-over portion. The reference numerals ①, ② and ③ denote turns of wire in this order. As can be seen in FIGS. 2, each successive turn of wire, e.g., turn 3, extends further in the axial direction of the cylindrical shape, which corresponds to the vertical direction in FIG. 2, than a previous turn of wire, e.g., turn 2. Further, as shown at the bottom of FIG. 2 which corresponds to the peripheral portion of the cylindrical shape, each successive turn of wire will extend in the circumferential direction, e.g., horizontally in FIG. 2, for a greater distance than a previous turn of wire. Still further, since the wires in any given band cross one another as shown in FIG. 2, each successive turn of wire in the shoulder portion at the top of FIG. 2 will be closer to the center axis of the cylindrical shape than a previous turn of wire in the same band, so that each successive turn of wire will extend for a greater distance in the shoulder portion than a previous turn of wire in the same band. As shown in FIG. 3, the cross-over portion C tends to develop toward the shoulder portion on the trailing side of the wire turn.

Figure 4:
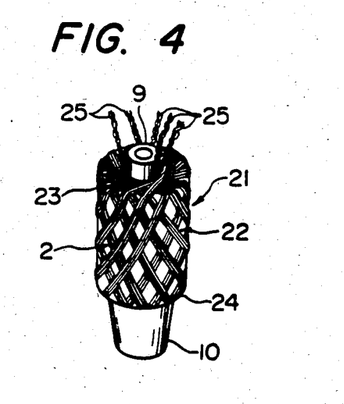
FIG. 4 is a perspective view of the winding through an aligning manner according to the invention.
Figures 5, 6:
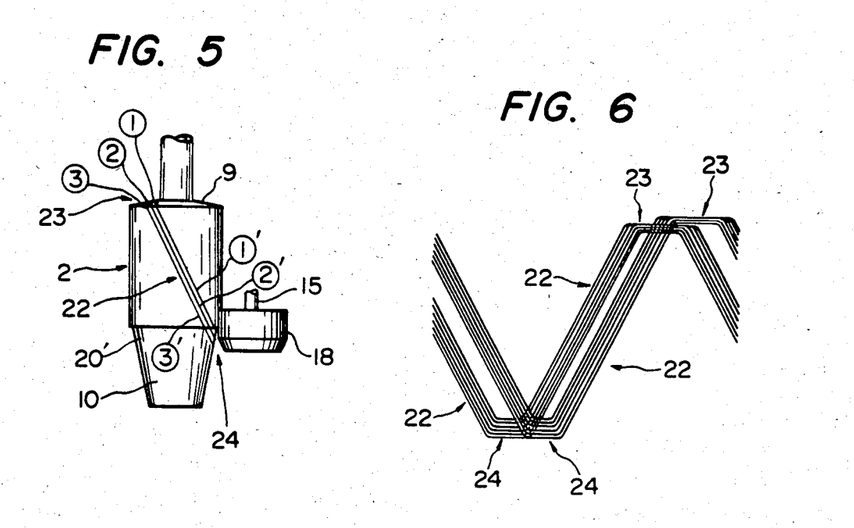
FIG. 5 is a schematic side elevational view showing the wire band wound around the winding core according to the present invention.
FIG. 6 is a developed view of the wire band shown in FIG. 5.

In FIG. 4, the aligned cylindrical winding is provided with a wire band 22. This wire band 22 is formed with a predetermined pitch around the periphery of the core 2. One portion of the wire is in engagement with the shoulder portion 9 so as to constitute the bowstring portion 23 as shown in FIGS. 5 and 6. In addition, there is formed the peripheral portion 24 of the wire band 22 at the side of the shoulder portion 10 as shown in FIG. 4. In FIG. 4, reference numeral 25 denotes the terminal line for tapping. The peripheral portion 24 forms an opening. The winding is taken away from the side of the shoulder portion 9 of the core 2.

In case the winding core 2 has a short axial length in comparison with a diameter, an aligned winding without any twisted cross-over portion explained above may be obtained as shown in FIG. 6. As can be seen in FIG. 6, since the wires in each band do not cross one another in the inclined portion but are instead substantially parallel with one another, each wire in any given band will extend for a greater distance in the peripheral portion 24 than a previous wire in the same band, but each wire and the bow string portion 23 will extend for a shorter distance than a previous wire in the same band. This is due to the fact that, as shown in FIG. 5, each successive wire in the bow string portion will be displaced further from the central axis of the cylindrical shape than a previous wire in the same band, so that it need traverse a smaller chord of the bow string portion. It can also be seen that each band of wire in the peripheral portion 24 extends for a distance which is at least equal to the width of the band.

Referring again to FIG. 4, explanation will be made as to the cup-shaped winding which is produced in accordance with the step winding method. This winding is provided with wire bands 22 in which the wire is wound stepwise. This wire band 22 is formed with a predetermined pitch around the periphery of the cylindrical winding core 2. A part of the wire 21 is laid around the shoulder portion 9 so as to constitute the bowstring portion 23 of the wire band 22 as shown in FIG. 4. In addition, there is formed a peripheral portion 24 of the wire band 22 at the side of the shoulder portion 10. In this case, the bowstring portion 23 approaches the axis center as the winding of wire is formed depending upon a relationship between the diameter and the axial length of the core. Therefore, the length of the bowstring portion 23 decreases gradually.

On the other hand, the peripheral portion 24 formed at the side of the shoulder portion 10 is wound along the peripheral slant surface of the shouldered portion 10 far from the shoulder portion 9. As a result, the peripheral length thereof gradually becomes long. The portion between the bowstring portion 23 and the peripheral portion 24 is inclined as shown in FIG. 5. The inclined portion is aligned as shown. As can be seen in FIGS. 4 and 5, the bands forming the cup-shaped winding will be substantially symmetrical with respect to the center axis of the cylindrical shape.

Figure 7:
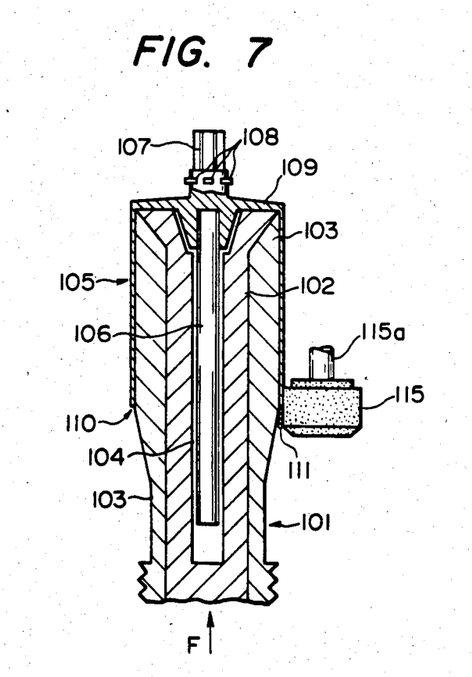
FIG. 7 is a cross-sectional view showing the winding core according to another embodiment of the invention.

FIG. 7 is a longitudinal cross sectional view illustrating a cylindrical winding in accordance with another embodiment of the invention with the embodiment being collectively illustrated in FIGS. 7-10. In FIG. 7, reference numeral 101 denotes a winding core. This cylindrical core 101 is composed of an inner cylinder 102 and an outer cylinder 103, so that the outer cylinder 103 may rotate together with the inner cylinder 102 around its own axis. There is formed an insertion hole 104 which extends in the axial direction at the center of the inner cylinder 102. A bobbin 105 is mounted on the outer cylinder 103. A film sheet is subjected to a hot pressing so as to produce the bobbin 105 in order to make small an air gap. A rotary shaft 106 and a commutator 107 are formed in integral with this bobbin 105 in accordance with a molding method. This rotary shaft 106 is inserted into the insertion hole 104. There is mounted the commutator 107 as well as risers 108 on the bobbin 105. The wire which is prepared for tapping is soldered to the risers 108.

Figure 8:
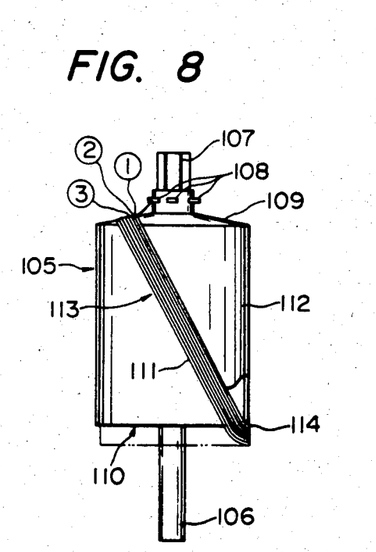
FIG. 8 is a side elevational view showing the wire band wound around the winding core shown in FIG. 7.
Figure 9:
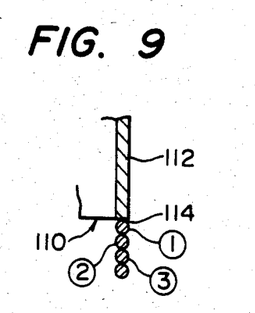
FIG. 9 is a partial enlarged view showing the opening end face of the core shown in FIG. 7.

The bobbin 105 is provided with a shoulder portion 109 and an opening end surface 110. In this case, the bobbin 105 is formed so that its axial length is long in comparison with its diameter. The wire 111 is aligned and wound obliquely with respect to the axis line of the bobbin 105 on the peripheral surface 112 of the bobbin between the shoulder portion 109 and the opening end face 110. FIG. 8 shows a wire band 113 in accordance with the aligning winding method. The wire 111 is aligned so as to engage the shoulder portion 109 from the inner side towards the outer side in the order indicated by reference numerals ①, ②, ③ .... The wire 111 is aligned with the opening end face 110 in the vicinity of the opening edge 114. In FIG. 9, reference numerals ①, ②, ③ denote the order in accordance with which the wire 111 is aligned and wound. An elastic roller 115 made of rubber or the like is pushed against the peripheral surface 112 in the vicinity of the opening end face 110 as shown in FIG. 7, so that the winding may not drop from the opening end 110 as the wire 111 is being wound. The elastic roller 115 is supported rotatably on a support shaft 115a. In a winding operation, there may be employed a zigzag winding or a fly winding using a winding head.

Figure 10:
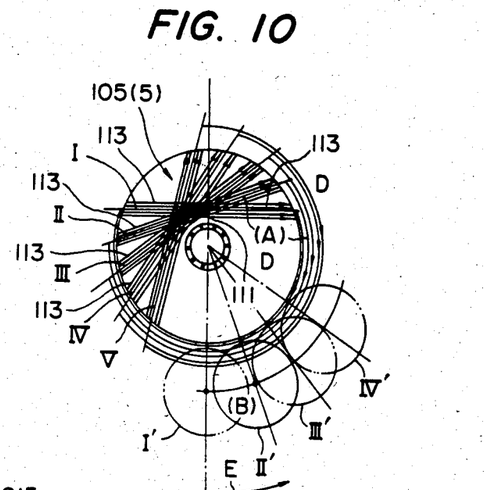
FIG. 10 is a view illustrating the winding order in the apparatus shown in FIG. 7.

FIG. 10 is a top view showing the order in accordance with which the wire bands I, II, III, IV and V are formed over the shoulder surface of the bobbin 105 around the periphery thereof. The wire band I in FIG. 10 and the wire 111 is drawn out for tapping as shown in FIG. 8. Therefore, the roller 115 is rotated by a predetermined angle with respect to the bobbin 105 in the direction indicated by the arrow E and then stopped. As indicated by the reference numeral II, the wire 111 is aligned and wound in the direction indicated by the arrow D so as to form the wire band 113. As indicated by the reference characters III to V, the wire band 113 is formed over the surface, as shown in FIG. 4, around the periphery of the bobbin 105. The inner cylinder 102 is pushed in the direction indicated by the arrow F in FIG. 7, so that the bobbin 105 is removed from the outer cylinder 103.

Since the present invention resides in the cylindrical winding in which the wire is wound around the bobbin as mentioned above, the wire is prevented from being injured when the cylindrical winding is dismounted from the cylindrical core. In addition, since one portion of the coil wire band is aligned on the opening end surface of the bobbin at the side of the opening end surface of the bobbin in the cylindrical winding, the portion which the wire engages reduces the increase of the thickness in the direction of the diameter of the bobbin at the side of the opening end surface of the bobbin, thereby making it possible to form the well balanced cylindrical winding.

Figure 11:
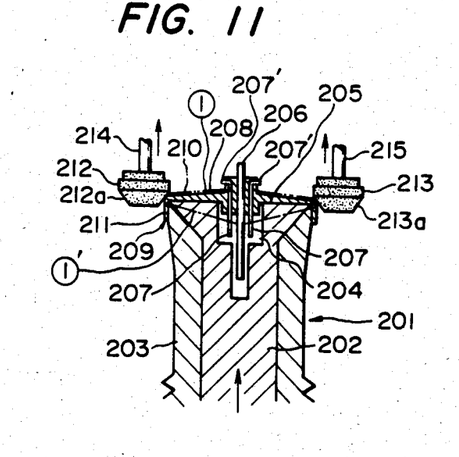
FIG. 11 is a cross-sectional view showing another embodiment of the invention.
Figure 12:
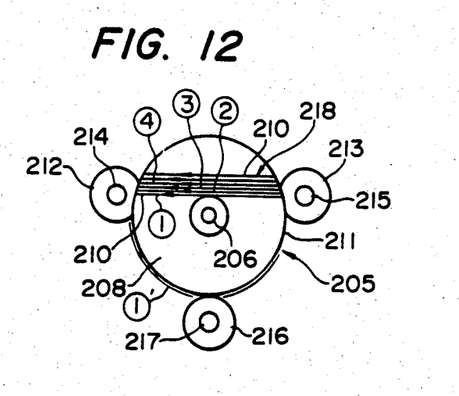
FIG. 12 is a plan view of the apparatus shown in FIG. 11.
Figure 13:
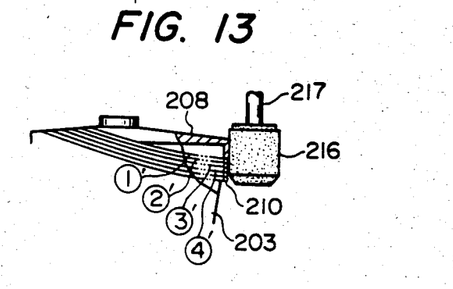
FIG. 13 is a partial enlarged view of the apparatus shown in FIG. 11.
Figure 14:
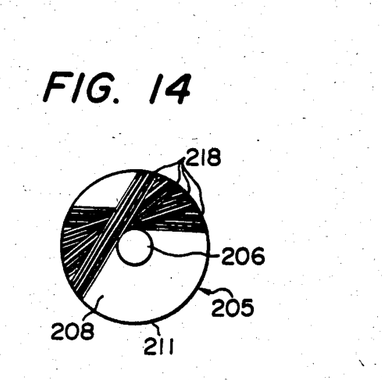
FIG. 14 is a plan view illustrating the overlapping wire bands on the bobbin shown in FIG. 11.

FIGS. 11–16 show another embodiment of the invention, in which a flat shaped winding is attained. In FIG. 11, reference numeral 201 denotes a winding core which includes an inner cylinder 202 and an outer cylinder 203. The inner cylinder 202 is provided with an insertion hole 204. The inner cylinder 202 can be reciprocated with respect to the outer cylinder 203 in its axial direction so that, after producing a cup-shaped winding, the core 202 can be dismounted from the core 201. The outer cylinder 203 rotates together with the inner cylinder 202. On the outer cylinder 203, there is mounted a bobbin 205 as the core. A rotary shaft 206 and a commutator 207 are formed integral with the bobbin 205 through molding. The rotary shaft 206 is inserted into the insertion hole 204. The bobbin 205 is formed of a flat type cylinder of which the diameter is long in comparison with the axial length thereof. The risers 207' are projected radially outwardly. The bobbin 205 is provided with a shoulder portion 208 and an opening end face 209 at ends thereof, respectively. The commutator 207 axially extends the opening end face 209 of the bobbin 205. The wire 210 is aligned and wound on the peripheral surface 211 of the bobbin 205 obliquely between the shoulder portion 208 and the opening end face 209. There are provided a pair of elastic rollers 212, 213 as shown in FIG. 12 at the side of the shoulder portion 208 of the bobbin 205. The elastic rollers 212, 213 are rotatably supported on support shafts 214, 215, respectively. The elastic rollers 212, 213 can be reciprocated in the direction in which the support shafts 214, 215 extend. There is provided an elastic roller 216 on the opening end face 209 side of the bobbin 205 so as to rotate about its support shaft 217. The elastic rollers 212, 213 are formed like truncated cones to have tapered surfaces 212a, 213a. The tapered surfaces 212a, 213a are pushed against the corner edge of the shoulder portion 208. As shown in FIG. 12, the elastic roller 216 is pushed against the peripheral surface 211 of the bobbin 205 on the circumference between the pair of elastic rollers 212, 213. The elastic rollers 212, 213 have in combination a function to cause the wire 210 to be aligned and wound on the surface of the shoulder portion 208 for producing a wire band like a bowstring. On the other hand, the elastic roller 216 has a function to cause the wire to be located in alignment with opening end face 209 of the bobbin 205. The wire 210 is aligned and wound to form a wire band 218 as shown in FIGS. 12 to 14. In this case, the elastic rollers 212, 213 and 216 are arranged so that the wire 210 is retained in engagement with the opening end face 209. In FIG. 12, the arrows denote the wire winding direction.

A well known method in accordance with a zigzag winding or a fly winding using a winding head may be used when the wire 210 is wound around the bobbin 205. Explanation will be made as to the order for winding the wire with reference to FIGS. 12 and 13.

Figure 15:
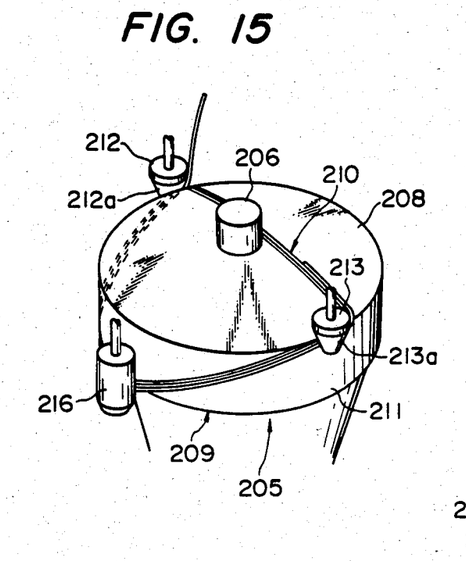
FIG. 15 is a perspective view of the apparatus shown in FIG. 11.
Figure 16:
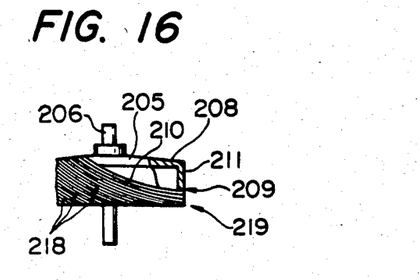
FIG. 16 is a side elevational, fragmentary in part, view showing the winding wound on the bobbin shown in FIG. 11.
Figure 17:
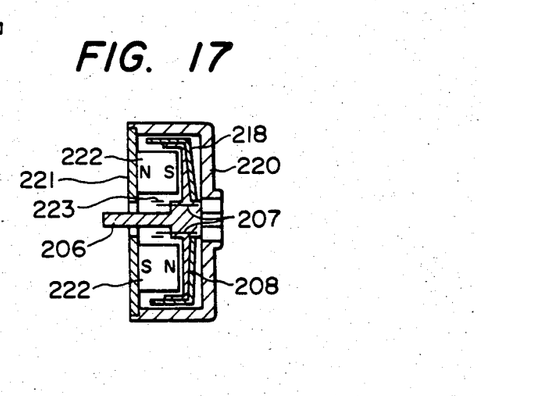
FIG. 17 is a cross-sectional view showing the winding incorporated in the motor.

In order that the wire 210 is aligned and wound, the wire 210 is wound along the surface of the shoulder portion 208 and the surface of the outer cylinder 203. Hence, the wire 210 is rendered to engage with the shoulder portion 208 from the vicinity of the rotary shaft 206 as indicated by reference numeral ① in FIG. 12. The wire 210 is oriented to the opening end face 209 as indicated by reference numeral ①' while keeping the wire 210 in contact with the elastic roller 212. The wire 210 is guided along the peripheral surface 211 of the bobbin 205 as indicated by the reference numeral ①' in FIG. 11 so as to extend obliquely across its axis line, so that the wire 210 is made to engage with one portion of the opening end face 209 where the elastic roller 216 exists. Then, the wire 210 is directed to the shoulder portion 208 at the portion where the elastic roller 213 exists by the elastic roller 216 and is brought into contact with the elastic roller 213, and hence, this wire 210 is made to engage with the shoulder portion 208. The series of these operations are performed as indicated by the reference numerals ② to ④ and ②' to ④', thereby producing wire bands 218 as a split coil. The wire 210 is drawn out for tapping, and thereafter, the bobbin 205 is rotated together with the core 201 by a predetermined angle with respect to the elastic rollers 212, 213 and 216. This operation is repeated predetermined times corresponding to the number of the divided coils, so that a plurality of wire bands 218 around the periphery of the bobbin 215 may be formed as shown in FIG. 14. FIG. 15 is a perspective view showing the wire winding order. The inner cylinder 202 and the elastic rollers 212, 213 are moved in the directions as indicated by the arrows in FIG. 11 and the core 201 is dismounted from the bobbin 205, thereby producing the winding like a bottomed cup cylinder. The wire 210 is aligned to form the band as shown in FIG. 16 when the wire 210 is made to engage with the opening end face 209. The thickness in the radial direction is not so much increased at this engaging portion to form a well balanced cup-shaped winding 219. On the upper surface at the side of the shoulder portion 208, the wire 210 is aligned in parallel and wound by the assistance of elastic rollers 212, 213 so that the winding will not be at a high level with respect to the bobbin 205. After the wire bands 218 are formed over the peripheral surface of the bobbin 205, the wire 210 for tapping is soldered to the risers 207'. After the wire bands 218 are formed over the peripheral surface of the bobbin 205, the commutators 207 are held in a cylindrical space formed in the wire 218. FIG. 17 shows the state in which a motor is assembled using the thus formed winding 219. In FIG. 17, 220 denotes a case, 221 denotes a case cover, 222 denotes permanent magnets and 223 denotes a brush.

Figure 18:
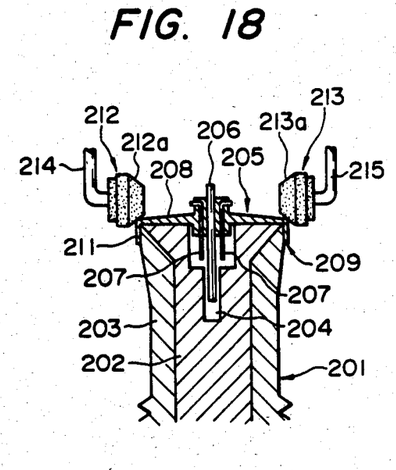
FIGS. 18 and 19 are cross-sectional views showing still other embodiments of the invention.
Figure 19:
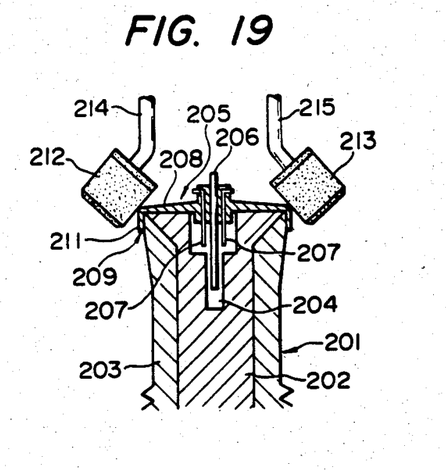

FIGS. 18 and 19 show other embodiments of the method and the apparatus for manufacturing a cup-shaped winding in accordance with the invention. FIG. 18 shows an embodiment in which the support shafts 214, 215 of the pair of elastic rollers are horizontally arranged. In the embodiment which is shown in FIG. 19, the pair of elastic rollers 212, 213 are made cylindrical, so that their peripheral surfaces are obliquely pushed against the corner edge of the shoulder portion 208. In FIGS. 18 and 19, the like components and members are designated by the same reference numerals as used in the embodiment shown in FIG. 11.

Figures 20, 21:
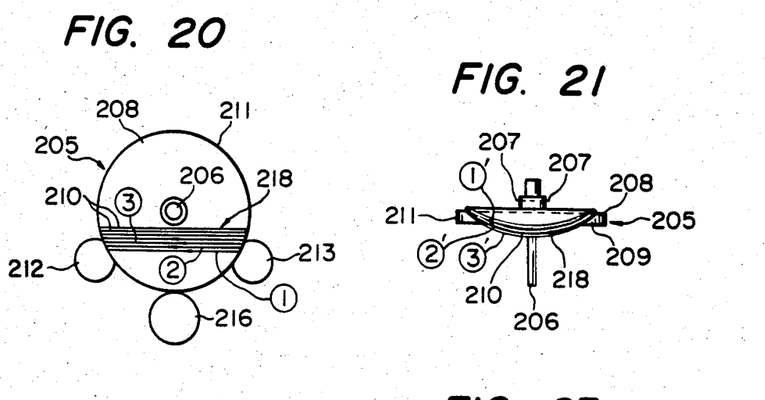
FIGS. 20 and 21 are plan and side views showing another embodiment of the invention.
Figure 28:
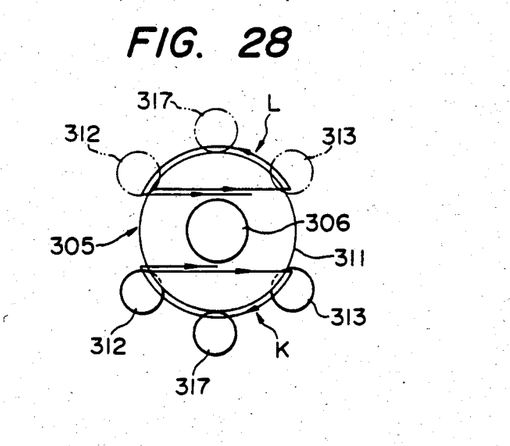
FIG. 28 is a view showing the winding order for obtain the winding shown in FIG. 27.

FIGS. 20 and 21 show still another embodiment of the winding method. The pair of elastic rollers 212, 213 and the elastic roller 216 are arranged close to each other with the rotary shaft 206 as the boundary. In FIG. 20, reference numerals ①, ②, ③ denote the order in which the wire 210 is wound. As can be seen in FIGS. 20 and 28, the rotary shaft passes outside of the area circumscribed by each band. As a consequence, each wire in any given band, as shown most clearly in FIG. 20, will pass in the bow string portion somewhat closer to the rotary shaft than a previous turn of wire in the same band, thus necessitating that each wire traverse a larger chord in the bow string portion than a previous turn of wire in the same band. As can be seen most clearly in FIG. 28, the bands of wire forming the cup-shape winding will be substantially symmetrical with respect to the center axis of the cylindrical shape. In FIG. 20, the distance of the engaging portion from the shoulder portion 208 to the opening end face 209 is made short, so that the length of the wire 210 required for forming one wire band 218 is decreased. As a result, the resistance loss is made small and the overlapping of the wire band 218 on the peripheral surface is also made small. In addition, advantageously, the inertia of the cup-shaped winding is also made small.

In the foregoing embodiments, the wire 210 is wound around the bobbin 205 to form the cup-shaped winding 219. However, the wire 210 can be wound directly around the winding core 201 to manufacture the cup-shaped winding 219 in case of the wire having a diameter more than 0.1 mm. However, in case of the wire 210 having a diameter smaller than 0.1 mm, it is preferable that the wire 210 be wound around the bobbin 205 in order to prevent the wire 210 from being damaged or cut. In addition, also, the elastic rollers 212, 213, 216 can be rotated along the peripheral surface of the bobbin 205 while they rotate on their own axes.

In accordance with the invention, since the pair of engaging roller members are pushed against the shoulder portion of the core having the shoulder portion at the end thereof so that the winding engages the shoulder portion as the aligned wire band like a bowstring, it is possible to provide the cup-shaped winding having the aligned and wound wire with the short axial length in comparison with its diameter, thereby obtaining the well balanced cup-shaped winding.

In accordance with the apparatus for manufacturing a cup-shaped winding of the invention, since the peripheral surfaces of the pair of elastic rollers are obliquely pushed against the corner edge of the shoulder portion of the bobbin, the peripheral surfaces of the elastic rollers come into contact with only the corner edge of the shoulder portion, whereby the wire may be obliquely oriented on the peripheral surface of the winding core from the shoulder portion.

Figure 22:
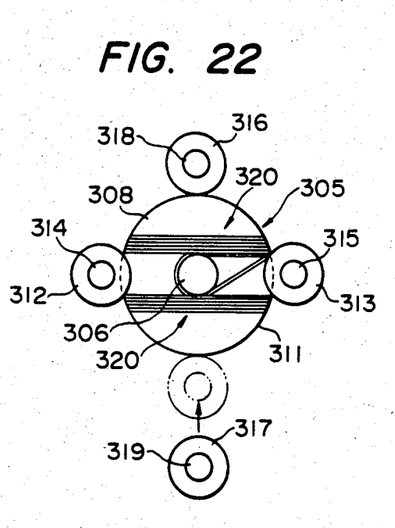
FIG. 22 is a plan view showing another embodiment of the invention.

FIGS. 22 to 28 show another embodiment of the invention, in which the like winding apparatus in FIG. 11 is used. A pair of elastic rollers 312, 313 are provided as shown in FIG. 22 at the side of the shoulder portion 308 of the bobbin 305 on both sides of a rotary shaft 306 to be symmetrical with the rotary shaft 306 as the boundary. Reference numerals 314, 315 denote the support shafts thereof. A pair of elastic rollers 316, 317 are provided on both sides of the rotary shaft 306 with the rotary shaft 306 as the boundary. Reference numerals 318, 319 denote the support shafts thereof. One of the pair of elastic rollers 316, 317 is positioned apart from the peripheral surface 311 of the bobbin 305 so as not to become an obstacle at the time when the wire 310 is wound in case the other of them is pushed against the peripheral surface 311 of the bobbin 305 as shown in FIG. 22. Since the wire 310 is made adhere onto the bobbin 305, for example, by a thermal fusing or sticking means, there is caused no trouble even if the pair of elastic rollers 316, 317 are alternately positioned away from or close to each other. The elastic rollers 312, 313, 316, 317 are arranged such that the straight line connecting the pair of elastic rollers 312, 313 is perpendicular to the straight line connecting the pair of elastic rollers 316, 317, and the elastic rollers 312, 313, 316 and 317 are rotatable with respect to the support shafts 314, 315, 318 and 319 respectively.

Figure 23:
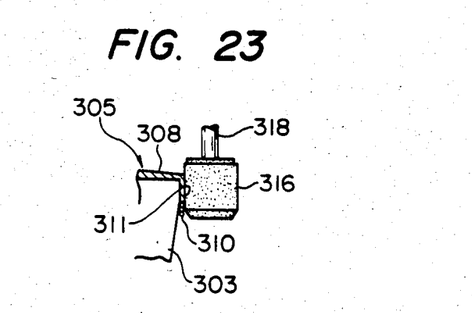
FIG. 23 is a partial enlarged view of the apparatus shown in FIG. 22.

The tapered surfaces 312a, 313a of the rollers 312, 313 are pushed against the edge of the shoulder portion 308. The peripheral surface of the rollers 316, 317 are pushed against the peripheral surface 311 of the bobbin 305 over the surface thereof in the axial direction as shown in FIG. 23. Each of the elastic rollers 312, 313, 316, 317 has a function as a member which the wire 310 engages so that the wire 310 may not be slid. The wire 310 is aligned and wound so as to form wire bands 320 as shown in FIG. 22. The wire 310 is made to laid from the shoulder portion 308 to the opening end face 309 which is distant therefrom with the rotary shaft 306 as the boundary.

Figure 24:
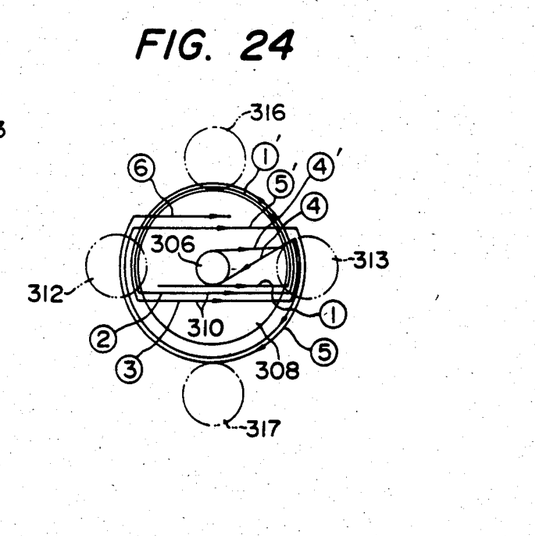
FIG. 24 is an illustration for the winding order attained in the apparatus shown in FIG. 23.
Figure 25A:
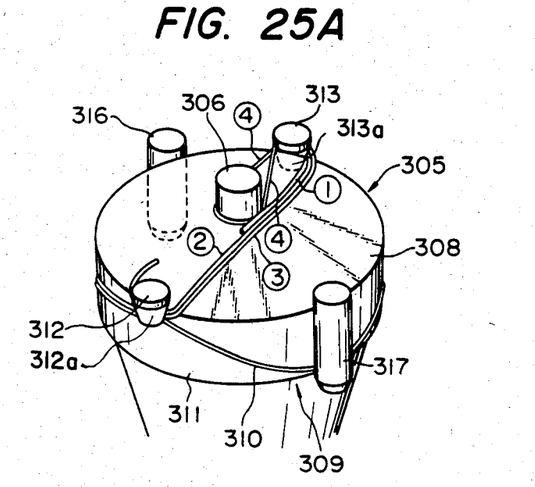
FIGS. 25A and 25B are perspective and partial views of the apparatus shown in FIG. 22.
Figure 25B:
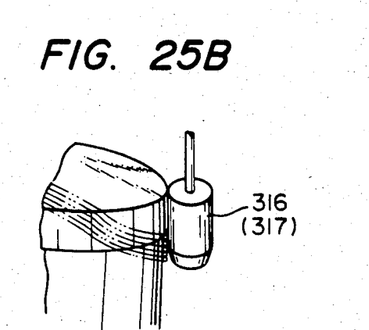
Figure 26:
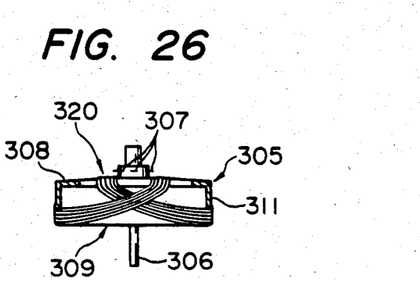
FIG. 26 is a fragmentary side view showing the wire band in the apparatus shown in FIG. 22.
Figure 27:
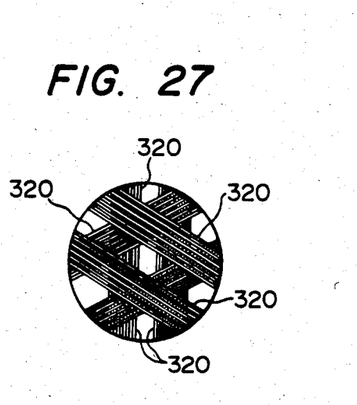
FIG. 27 is a plan view of another embodiment of the invention.

An explanation will be given in respect of this with reference to FIG. 24. The wire 310 is directed to the elastic roller 313 along the surface of the shoulder portion so that the wire 310 may be aligned as indicated by reference numeral ①, thereby aligning the wire 310 like a bowstring by the assistance of the elastic roller 313. This is made to engage the shoulder portion 308, and the wire 310 is directed in the direction in which the elastic roller 316 exists along the peripheral surface towards the opening end face 309, and this elastic roller 316 is utilized to prevent the wire 310 from being slid and dropped and the wire 310 is laid by the surface of the elastic roller 316 and the surface of the outer cylinder 303 beyond the opening end so that the wire 310 is aligned on the opening end surface 309. After the wire 310 is passed by way of the elastic roller 316, the wire 310 is directed in a direction in which the elastic roller 312 exists towards the side of the shoulder portion 308, so that the wire 310 is again made to engage the shoulder portion 308 as indicated by reference numeral ②. This operation is repeated so that the wire bands 320 formed at one side only. Therefore, the wire 310 is directed towards the elastic roller 313 as indicated by reference numeral ③, so that the wire 310 is made to engage the elastic roller 313. The wire 310 is directed to the rotary shaft 306 as indicated by reference numeral ④ so that the wire 310 engages the rotary shaft 306. Then, the wire 310 is again directed to the elastic roller 313 as indicated by reference numeral ④, so as to invert the winding direction. Thereafter, the wire 310 is directed in the direction in which the elastic roller 317 exists and in which the opening end face 309 exists as indicated by reference numeral ⑤ so that the wire 310 is made to engage with the opening end face 309 utilizing this elastic roller 317. The wire 310 is passed by this elastic roller 317 and directed in the direction in which the elastic roller 312 exists towards the shoulder portion 308. The wire 310 is made to engage the shoulder portion 308 as indicated by reference numeral ⑤ while the wire 310 is being aligned like a bowstring uti elastic roller 312. This operation is repeated so that wire bands 320 may be symmetrically arranged on both sides of the rotary shaft 306 with the rotary shaft 306 as the boundary as shown in FIG. 22. FIG. 25 is a perspective view showing the winding thereof. In accordance with the winding method, a pair of wire bands 320, 320 are made to cross each other on the peripheral surface of the bobbin 305 as shown in FIG. 26. The wire 310 is aligned and laminated so as to engage the surface as shown in FIG. 26 at the side of the opening end surface 309, and this engaged portion reduces the increase of the thickness in the radial direction. Hence, after the symmetrical wire bands 320, 320 are formed as the set, the wire 310 is drawn out for tapping. Then, the bobbin 305 is rotated through a predetermined angle with respect to the elastic rollers 312, 313, 316, 317 so that the sets of symmetrical wire bands are repeatedly formed. The bobbin 305 is rotated for every 120° together with the rotary cylinder so as to form the sets of symmetrical wire bands. FIG. 27 shows three sets of symmetrical wire bands.

FIG. 28 shows another embodiment of the cup-shaped winding in accordance with the present invention. In accordance with the embodiment, the wire 310 is made to engage the surface from the shoulder portion 308 which the wire 310 engages to the opening end surface 309 at the side which is close thereto with the rotary shaft 306 as the boundary. After the wire 310 is wound as indicated by reference character K in the drawing, the wire 310 is wound as indicated by reference character L so as to form a set of symmetrical wire bands 320. In accordance with the winding method, the set of wire bands 320 do not cross each other. In this embodiment, the angle that the wire 310 is pulled around becomes small so that the length of the engaging portion from the shoulder portion 308 to the opening end face 309 is made short. As a result, (1) the resistance loss is reduced, (2) the overlapping of the peripheral wire bands is reduced and (3) the inertia is also reduced.

As explained above, since the invention resides in the cup-shaped winding in which the wire bands are symmetrically formed on both sides of the rotary shaft with the rotary shaft as the boundary, it is possible to form the well balanced cup-shaped winding, in particular, as required in case the winding is like a short or flat cylinder. This brings about the effects as follows in case this winding is used as an armature.

The mechanical and electrical oscillation noise is reduced.

Even if the diameter is small as the flat armature like a short cylinder, the torque is rather large.

The inertia is small.

Figures 29, 30, 31, 32, 33:
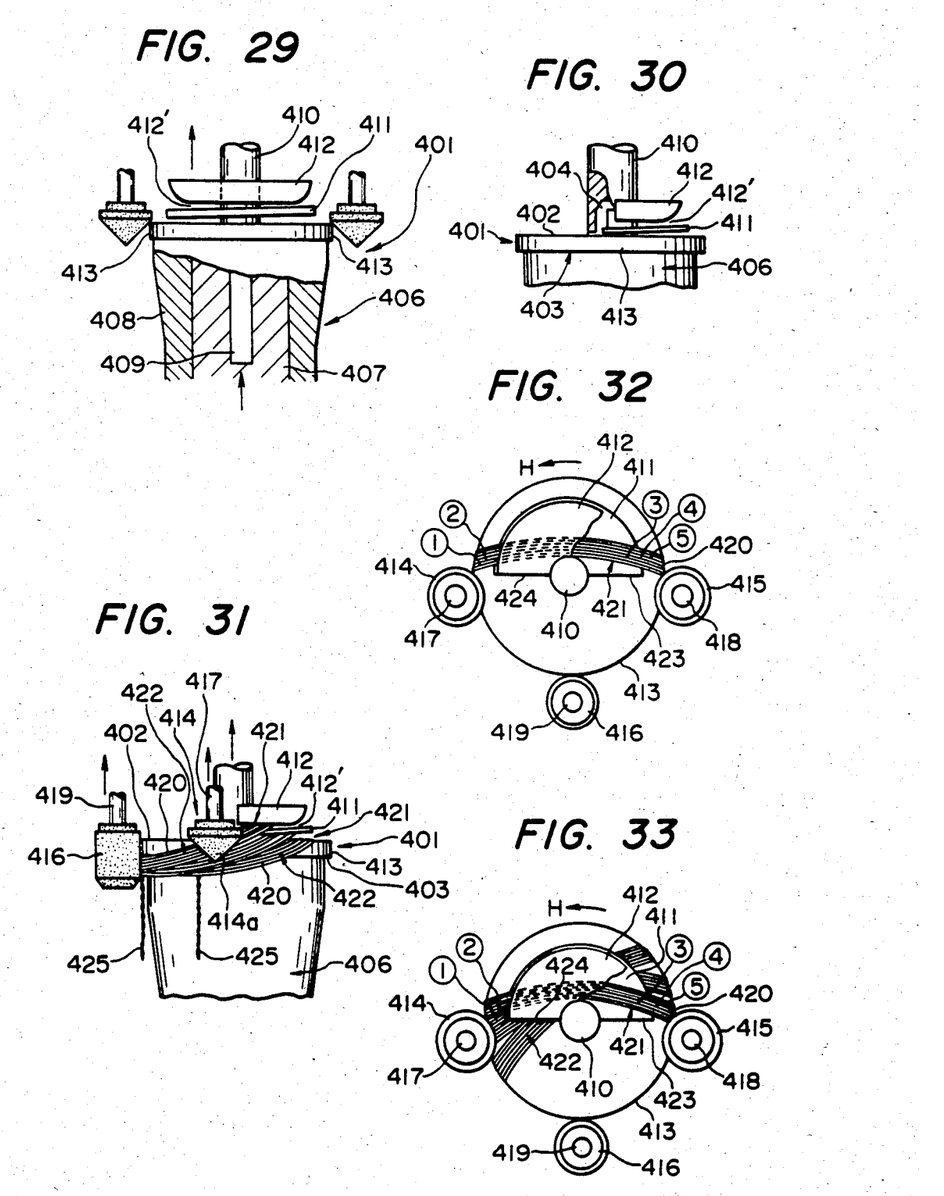
FIG. 29 is a view showing still another embodiment of the invention.
FIGS. 30 to 34 show the apparatus shown in FIG. 29.

Another embodiment of the invention will now be described. A bobbin 401 is mounted onto a cylindrical core 406 as shown in FIG. 29. A winding core 406 is composed of axially displaceable inner cylinder 407 and outer cylinder 408. In the inner cylinder 407, there is formed a hole 409 into which is inserted the rotary shaft 404. The outer cylinder 408 is rotated together with the inner cylinder 407. There is provided a shaft 410 above the winding core 406 so that the axis of the rotary shaft 410 is aligned with the axis of the cylindrical core 406 as shown in FIGS. 30 and 31. The shaft 410 is provided with aligning plate 411 and guide plate 412 which are adapted to cooperate with each other for aligning the wire. The interval 412' between the aligning plate 411 and guide plate 412 is suitably selected so as to align the wire in a plurality of turns of wire as well as a single turn. The aligning plate 411 is slightly obliquely supported by the shaft 410. It is desired that the aligning plate 411 be made somewhat larger than a half circular disc in case of a winding for two poles and be made larger than a three-fourths circular poles in case of the winding for four poles. In addition, the size of the guide plate 412 is made equal to or larger than that of the aligning plate 411.

Three elastic rollers 414, 415, 416 supported by support shafts 417, 418, 419 are pushed against a peripheral surface 413 of the bobbin 401 as shown in FIGS. 32 and 33. The elastic rollers 414 and 415 are formed like cones. Reference numeral 414a in FIG. 31 denotes the tapered surface of the elastic roller 414. The elastic roller 416 is formed like a cylinder. The wire 420 is aligned so as to engage the shoulder portion. Each of the elastic rollers 414, 415, 416 has a function to align and engage the wire 420 when the wire 420 is wound and press the wire bands so as to be in contact with each other and made flat by its movement while rotating on its own axis in contact with the wire. As shown in FIGS. 32 and 33, the aligning plate 411 and the guide plate 412 are, respectively, of a semicircular configuration. When the wire 420 is wound around the bobbin 401, the elastic rollers 414, 415 are utilized so that the wire 420 is laid on the shoulder portion 402 and is pushed against and retained at the surface of the aligning plate 411. In addition, the elastic roller 416 is used for retaining the wire at the opening end face 403. This operation is repeated a plurality of times. The wire is laid on the aligning plate 411 as indicated by reference numerals ①, ②, ③, ④, ⑤ at the shoulder portion side. The wire band 421 formed on the aligning plate 11 is aligned. The turns of wire of the wire band 420 are prevented from overlapping one on another. As can be clearly seen in FIGS. 32 and 33, which are views from the axial direction of the winding, each band in the bow string portion will form a substantially curved shape.

After the wire bands 422 are formed as mentioned above, the rotary shaft 410 is rotated in the direction indicated by the arrow H with respect to the bobbin 401 as shown in FIGS. 32 to 35. When only the aligning plate 411 is rotated through 360° while the rollers 417, 418, 419 are kept in this state, the wire band 421 laid on the aligning plate 411 fall down out of the trailing edge 423 of the aligning plate 411 and is brought into contact with the shoulder surface of the bobbin. After the aligning plate 411 is rotated through 360°, the leading edge 424 comes just above the wire band 421 on the surface of the bobbin. Then, lead wires 425 for tapping are drawn out as shown in FIG. 31, and after the wire bands are fully wound over the surface of the bobbin, the lead wires are connected and soldered onto the risers. In case the cup-shaped winding is used in the brushless motor, they are used as input lead wires as they are. The winding core 406 and the bobbin 403 are rotated through a predetermined unit angle with respect to the shaft 410 and the elastic rollers 414, 415, 416. This operation is repeated so that a plurality of wire bands 422 are formed over the peripheral surface of the bobbin 401. The bobbin 401 can be dismounted by moving the inner cylinder, the roller shafts 417, 418 and the aligning plate shaft 410 respectively, as indicated by the arrows in FIG. 29. FIG. 35 shows a cylindrical coil winding 426 which is thus produced.

FIG. 35 shows the winding method for producing a winding for four poles in the same manner as described above. In FIG. 33, the angle defined by the leading edge 424 and the trailing edge 423 of the aligning plate 411 is below 90°.

What is claimed is:

1. A method for producing a winding for an electric motor, said method comprising the steps of:
   pushing a pair of rollers against a first shoulder portion at an end of a winding core, said winding core being rotatable about a first axis;
   pushing a further roller against the periphery of said core at a location remote from said shoulder portion;
   winding a wire around said core to form a band of wire surrounding said first axis and passing over said shoulder portion; and
   utilizing said pair of rollers for holding said band of wire in said shoulder portion away from said first axis while utilizing said further roller for holding a respective portion of said band of wire away from said shoulder portion.

2. A method as claimed in claim 1, further comprising the step of rotating said winding core in a step wise manner.

3. The method as claimed in claim 1, further comprising the step of rotating said winding core in a continuous manner.

4. The method as claimed in claim 1, wherein said pair of rollers are made of an elastic material and are deformed in the step of pushing against said shoulder portion.

5. A method for producing a winding for an electric motor, said method comprising the steps of:
   pushing a pair of rollers against a first shoulder portion at an end of a winding core, said winding core being rotatable about a first axis;
   pushing a further roller against the periphery of said core at a location remote from said shoulder portion, said further roller being on the same side of said first axis as said pair of rollers;
   winding a wire around said core to form a band of wire surrounding said first axis and passing over said shoulder portion; and
   utilizing said pair of rollers for holding said band of wire in said shoulder portion away from said first axis while utilizing said further roller for holding a prespective portion of said band of wire away from said shoulder portion.

6. A method for producing a winding for an electric motor, said method comprising the steps of:
   pushing a pair of rollers against a first shoulder portion at an end of a winding core, said winding core being rotatable about a first axis;
   pushing a further roller against the periphery of said core at a location remote from said shoulder portion, said further roller being on the same side of said first axis as said pair of rollers;
   winding a wire around said core to form a band of wire passing over said shoulder portion between said pair of rollers and said first axis; and
   utilizing said pair of rollers for holding said band of wire in said shoulder portion away from while utilizing said further roller for holding a respective portion of said band of wire away from said shoulder portion.

7. A method for producing a winding for an electric motor, said method comprising the steps of:
   pushing first and second rollers against opposite diametrical sides of a first shoulder portion at a first end of a winding core, said winding core being rotatable about a first axis;
   selectively pushing one of third and fourth rollers into contact with the periphery of said winding core at a point axially remote from said first end;
   winding a wire around said core to form a band of wire surrounding said first axis and passing over said shoulder portion; and
   utilizing said first and second rollers to hold said band of wire in said shoulder portion away from said one of said third and fourth rollers while using said selected one of said third and fourth rollers for holding a respective portion of said band of wire away from said shoulder portion.

8. An apparatus for producing a winding for an electric motor, said apparatus comprising:
   a winding core rotatable about a first axis and having a shoulder portion at a first end thereof;
   a pair of rollers in contact with said core adjacent said shoulder portion;
   a further roller in contact with the periphery of said core at a location remote from said shoulder portion; and
   winding means rotatable about a second axis inclined with respect to said first axis to form a band of wire surrounding said first axis, said pair of rollers hold said band of wire away from said first axis and said further roller holding a respective portion of said band of wire away from said shoulder portion.

9. An apparatus for producing a winding for an electric motor, said apparatus comprising:

a winding core rotatable about a first axis and having a shoulder portion at a first axial end thereof;

a pair of rollers in contact with said core adjacent said should portion;

a further roller in contact with the periphery of said core at a location remote from said shoulder portion, said further roller being on the same side of said first axis as said pair of rollers; and winding means rotatable about a second axis inclined with respect to said first axis to form a band of wire surrounding said first axis, said pair of rollers holding respective portions of said band of wire away from said further roller and said further roller holding a respective portion of said band of wire away from said shoulder portion.

10. An apparatus for producing a winding for an electric motor, said apparatus comprising:

a winding core rotatable about a first axis and having a shoulder portion at a first end thereof;

a pair of rollers in contact with said core adjacent said shoulder portion;

a further roller in contact with the periphery of said core at a location remote from said shoulder portion, said further roller being on the same side of said first axis as said pair of rollers; and winding means rotatable about a second axis inclined with respect to said first axis to form a band of wire passing over said shoulder portion between said pair of rollers and said first axis, said pair of rollers holding said band of wire in said shoulder portion and said further roller holding a respective portion of said band of wire away from said shoulder portion.

11. An apparatus for producing a winding for an electric motor, said apparatus comprising:

a winding core rotatable about a first axis and having a shoulder portion at a first end thereof;

first and second rollers contacting said winding core adjacent said shoulder portion and disposed on opposite sides of said first axis;

third and fourth rollers, and means associated with said third and forth rollers for selectively urging one of said third and fourth rollers into contact with the periphery of said winding core at a point axially remote from said first end; and winding means rotatable about a second axis inclined with respect to said first axis to form a band of wire surrounding said first axis and passing over said shoulder portion, with said first and second rollers holding said band of wire in said shoulder portion away from said one of said third and fourth rollers and said selected one of said third and fourth rollers holding a respective portion of said band of wire away from said shoulder portion.

12. An apparatus for producing a winding for an electric motor, said apparatus comprising:

a winding core rotatable about a first axis and having a shoulder portion at a first end thereof;

a pair of rollers contacting the periphery of said winding core adjacent said shoulder portion;

an additional roller urged toward said winding core at a position axially remote from said first end;

means, provided on one of said winding core and additional roller, for maintaining a gap between said winding core and a portion of said additional roller; and winding means rotatable about a second axis inclined with respect to said first axis to form a band of wire passing through said gap, with said pair of rollers holding said band of wire in a predetermined position in said shoulder portion.

13. An apparatus as claimed in claim 12, wherein said means on one of said winding core and additional roller comprises a bobbin having a thickness not substantially larger than a diameter of said wire and disposed on said winding core, said additional roller extending further than said bobbin in a direction away from said first end to thereby form said gap with said winding core.

14. A method for producing a winding for motors, comprising the steps of:

pushing at least one roller against at least one shoulder portion at an end of a winding core;

winding a wire around said winding core while laying said wire on said at least one shoulder portion;

utilizing said at least one shoulder portion as a member for holding said wire on said at least one shoulder portion; and rotating said winding core in a predetermined manner for obtaining a winding having a cylindrical shape and having a wire band in which the wire is wound in a concentrated manner, said wire band being formed with a predetermined pitch around the periphery of said winding core, one portion of said wire being laid on said shoulder so as to form a bow string portion of said winding while said wire is laid along the end of face of said winding core so as to form a peripheral portion of said winding which is distant from said shoulder portion in the axial direction thereof, said bow string portion being constituted in such a way that its bow string length gradually becomes large as the winding of said wire is grown while said peripheral portion gradually becomes large as the winding of said wire is grown, said wire band being provided with an inclined portion which is inclined with respect to the axial line of said winding core along the peripheral surface of said winding core between said peripheral portion and said bow string portion and each wire which constitutes said inclined portion crosses each other wire in said band in said inclined portion.

15. A method for producing a winding for motors, comprising the steps of:

pushing at least one roller against at least one shoulder portion at an end of a winding core;

winding a wire around said winding core while laying said wire on said at least one shoulder portion;

utilizing said at least one shoulder portion as a member for holding said wire on said at least one shoulder portion; and rotating said winding core in a predetermined manner for obtaining a winding in the form of a cylindrical shape and having a wire band in which the wire is wound in a concentrated manner, said wire band being formed with a predetermined pitch around the periphery of said winding core, one portion of said wire being laid on said shoulder so as to form a bow string portion of said winding while said wire is laid along the end face of said winding core so as to form a peripheral portion of said winding which is distant from said shoulder portion in the axial direction thereof, said bow string portion being constituted in such a way that its bow string length gradually becomes shorter as the winding of said wire is grown while said peripheral portion gradually becomes longer as the winding of said wire is grown, said wire band being provided with an inclined portion which is inclined with respect to the axial line of said winding core along the peripheral surface of said winding core between said peripheral portion and said bow string portion and each wire which constitutes said inclined portion in a band being aligned in said inclined portion.

16. A method for producing a winding for motors, comprising the steps of:

pushing at least one roller against at least one shoulder portion at an end of a winding core;

winding a wire around said winding core while laying said wire on said at least one shoulder portion;

utilizing said at least one shoulder portion as a member for holding said wire on said at least one shoulder portion; and rotating said winding core in a predetermined manner for obtaining a winding;

wherein at least three rollers are brought into contact with the peripheral surface of said winding core, two rollers among those rollers being used so that the wire is aligned to be laid on said shoulder portion, wherein an aligning plate and a guide plate are arranged in the axial direction of said winding core at the side of said shoulder portion and said wire is aligned to be laid on said aligning plate, wherein the roller other than said two rollers is used so that said wire is aligned to be laid on the opening end face, said wire being wound between said shoulder portion and said opening end face so as to form the wire bands while said wire passes through said guide plate, and wherein said aligning plate is rotated with respect to said winding core so that the wire bands laid on the aligning plate are dismounted from the aligning plate to be laid on the surface of the shoulder portion, thereby producing a cup-shaped winding.

17. An apparatus for producing a winding for motors, said apparatus comprising:

means for feeding a wire around a predetermined axis;

a winding core around which the wire is wound, said winding core having at least one shoulder portion at its one end;

at least one roller;

means coupled to said roller for pushing said roller against said winding core;

means coupled to said winding core for rotating said winding core around a predetermined fixed rotary axis in a predetermined manner; and auxiliary aligning means adjacent said winding core for more precisely aligning turns of said wire on said shoulder portion, said auxiliary aligning means including a guide plate and an inclined rotatable aligning plate, wherein said turns of said wire are guided through a gap defined between said guide plate and said aligning plate; and wherein the wire wound around said winding core is held on said shoulder portion by the assistance of said roller.

* * * * *